United States Patent [19]
Weis

[11] Patent Number: 5,237,970
[45] Date of Patent: Aug. 24, 1993

[54] IGNITION COIL ANTI-THEFT DEVICE

[76] Inventor: Joseph D. Weis, 5120 Towne Center Dr., St. Louis, Mo. 63128

[21] Appl. No.: 394

[22] Filed: Jan. 4, 1993

[51] Int. Cl.$^5$ .................. F02P 11/04; H01H 27/00
[52] U.S. Cl. ..................... 123/146.5 B; 307/10.3
[58] Field of Search ............ 123/146.5 B, 198 B; 307/10.3

[56] References Cited

U.S. PATENT DOCUMENTS

| | | | |
|---|---|---|---|
| 1,713,142 | 5/1929 | Norviel | 123/146.5 B |
| 3,773,138 | 11/1973 | Killmeyer | 307/10.3 X |
| 4,636,651 | 1/1987 | Kilgore | 123/146.5 B |
| 4,653,605 | 3/1987 | Goren | 307/10.3 |

Primary Examiner—Willis R. Wolfe

[57] ABSTRACT

A anti-theft ignition coil installation for the ignition system of an internal combustion engine of a conventional automobile having a driver's compartment with the installation comprising a chamber mounted in the driver's compartment for housing the ignition coil and an ignition key structure mounted in the ignition coil structure for electrically connecting the battery, ignition coil and starter. The ignition key structure is mounted integrally to the ignition coil with an anchor for activating the ignition coil when the proper key is inserted; however, if the key structure is altered by any means other than by the proper key, the anchor will render the ignition coil inoperable.

4 Claims, 1 Drawing Sheet

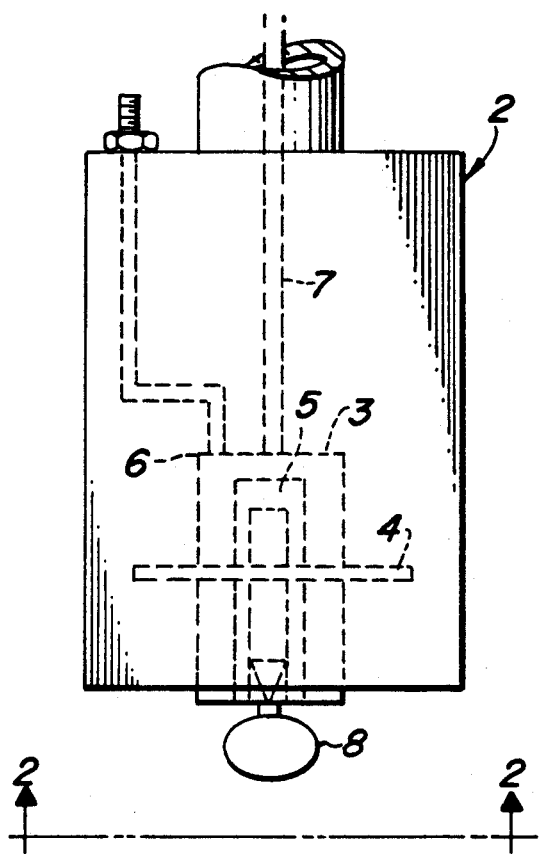
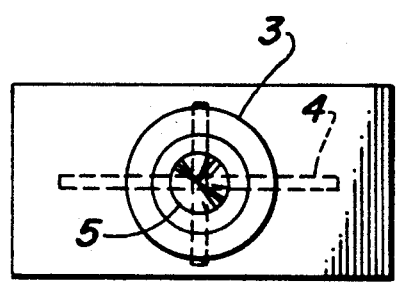
Fig. 1
Fig. 2

IGNITION COIL ANTI-THEFT DEVICE

BACKGROUND OF THE INVENTION

This invention relates to ignition systems and more particularly to an anti-theft ignition coil installation which is adapted to prevent and/or minimize the number of automobiles stolen. At present, the starting of a motor of a car or truck is normally done through the ignition switch which activates the contact wires to the coil and distributor. A thief quite often removes the key and/or the ignition lock by pulling or drilling and the "hot wires" to start the engine. In addition, it is possible, in some vehicles, to merely "hot wire", without pulling the key mechanism, the wires activating the coil and thus permitting the car to be started and driven away.

It may be necessary to remove the key in order to release the steering wheel lock mechanism, which in many instances is related to the running of the engine (i.e. if the engine is running, the steering wheel is automatically released so that one can steer the car).

Prior art inventions have been directed to systems where there have been means for controlling the coil by enclosing it in a container with an elaborate key system for rendering the coil inactive and inoperable when the key mechanism was in a particular position. This required an elaborate and expensive keying system and could be bypassed by "hot wiring" because the coil was still operable.

Another method in the prior art of anti-theft ignition coil installation is illustrated in U.S. Pat. No. 3,942,605 which comprises of a removable coil assembly including the ignition coil so that when you leave the automobile, you take the coil with you. This system is cumbersome and not conducive to the transportation requirements or facilities of the average individual.

BRIEF DESCRIPTIONS OF THE DRAWINGS

The drawings consist of FIG. 1 being a top view of the novel anti-theft mechanism of this invention, and FIG. 2 is a front view taken through the line 2—2 showing the novel mechanism of this invention.

DETAILED DESCRIPTION OF THE INVENTION

The invention consists of an ignition lock contained in a chamber 2 which may be a position of the steering column of an automobile or a tamper-proof device attached under the dashboard or surrounding the steering wheel, whichever system might be best suited for the manufacturers' design. The chamber is not shown mounted in a specific place in the automobile because such mounting would be within the skill of the art of the automotive designer. The ignition coil 3 consisting of a normal coil having a plurality of contacts is placed within the container 2. However, coil 3 also includes at least one anchor means 4, which means it passes through the coil 3 and also attaches to both the chamber and a lock means 5 which is contained in the coil 3. The anchor means 4 is attached to the keying and switching means 5 in such a manner that any unusual movement of the keying means 5 will cause the anchor 4 to render inoperable the coil 3. The coil may be rendered inoperable by disconnecting electrical connections or by physically destroying the coil member 3. The design of such destruction methods are not illustrated here because they are well within the skills of one designing coils and have been illustrated in prior art.

The hot wire from the battery or from the ampmeter is connected to the coil at connection 6, and the key mechanism connects the incoming hot wire 6 to the outgoing hot wire 7 that goes to the distributor.

FIG. 2 illustrates an unusual key mechanism which would be useful with this anti-theft device by improvement it over the normal automotive key system. However, the anti-theft device of this invention including the destruction of the coil can be used with a normal ignition key system of any automobile. The improved pick-proof or improved key system includes a round key which will have a regular ignition key serrations on one side and a combination of key members to restrict entry and use of the key on the other side. The key mechanisms in addition could have the front end made conical to make more difficult drilling of the center of the lock.

Modifications of the key mechanism may be made by one skilled in the art and not deviate from the invention as described herein.

The wire 7 from the coil to the distributor would normally be contained or protected by a steel tube or it might be placed, in some instances, inside of the steering column, all of this depending upon the desires of the automotive designer. The invention will work to prevent theft or deter theft in the same manner regardless of the method of connecting to the distributor.

In operation, the key 8 and the coil 3 operate as normal when the proper key is inserted to activate the ignition.

However, if an attempt is made to drill or pull the ignition lock, or in any other way render the ignition lock inoperable, in order to bypass the keying and switch mechanism 5 this invention will automatically, because of the movement of the anchors 4, render inoperable the coil 3, thereby preventing operation of the engine and the automobile.

The key mechanism 5 is tied as shown in FIG. 1 both physically and electrically to the anchor means. When the anchor means 4 are distorted physically or no longer connected to the key system 5 and the coil 3, then the coil is rendered inoperable. The coil may be physically or electrically incapacitated.

Various other features of the present invention, not specifically enumerated herein, will undoubtedly occur to those versed in the art, as will other modifications and alterations in the embodiments of the invention illustrated; all of which may be achieved without departing from the spirit and scope of the invention as defined in the appended claims.

What is claimed is:

1. An anti-theft ignition coil installation for activating the electrical ignition system of an internal combustion engine of a conventional automobile having a driver's compartment and a steering wheel therein:

said installation comprising a chamber mounted in said driver's compartment, a coil and on ignition key structure for activating said coil mounted in said chamber;

said key structure mounted in said coil structure electrically connecting the battery and said coil to the starter;

said key structure mounted integrally to said coil with anchor means;

said anchor means rendering said coil inoperable if said key structure is altered within said coil.

2. An anti-theft ignition coil system as claimed in claim 1 wherein said anchor means is a physical member placed at right angles to said key structure to render inoperable said coil upon removal of said key means from said coil structure.

3. An anti-theft ignition coil system as claimed in claim 1 wherein destruction of said key structure in said anchor means interrupts the electric connection within said coil, thereby rendering said coil inoperable.

4. An anti-theft ignition coil system, as claimed in claim 1, wherein said key structure includes a plurality of tumblers gageable by a key, at least one set of tumblers utilized for security purposes and at least one other set of said tumblers utilized for activating the ignition system.

* * * * *